United States Patent [19]

Jachmann et al.

[11] Patent Number: 5,604,317
[45] Date of Patent: Feb. 18, 1997

[54] ARRANGEMENT FOR TORQUE MEASUREMENTS IN MOTOR VEHICLES

[75] Inventors: Detlef Jachmann, Koblenz; Gregor Waldorf, Kasbach-Ohlenberg, both of Germany

[73] Assignee: Lucas Industries public limited company, Birmingham, Great Britain

[21] Appl. No.: 411,688

[22] PCT Filed: Jan. 12, 1994

[86] PCT No.: PCT/EP94/00077

§ 371 Date: Apr. 5, 1995

§ 102(e) Date: Apr. 5, 1995

[87] PCT Pub. No.: WO94/17380

PCT Pub. Date: Aug. 4, 1994

[30] Foreign Application Priority Data

Jan. 27, 1993 [DE] Germany ............................ 9301111 U

[51] Int. Cl.$^6$ ........................................................ G01L 3/02
[52] U.S. Cl. ........................................ 73/862.191; 73/116
[58] Field of Search ........................ 73/862.08, 862.191, 73/862.321, 862.325, 116, 146

[56] References Cited

U.S. PATENT DOCUMENTS 3,867,838  2/1975  Gerresheim .

4,186,596  2/1980  Bohringer et al. .
4,297,877  11/1981  Stahl .
4,748,844  6/1988  Yoshukawa et al. .

FOREIGN PATENT DOCUMENTS 4133418  4/1993  Germany .
1284251  8/1972  United Kingdom .

*Primary Examiner*—Elizabeth L. Dougherty
*Attorney, Agent, or Firm*—Oblon, Spivak, McClelland, Maier & Neustadt, P.C.

[57] ABSTRACT

An arrangement for torque measurements in motor vehicles includes a measuring hub which has first and second peripheral zones, a first adapter fastened to the first peripheral zone and adapted to be mounted on a vehicle hub, and a second adapter which is fastened to the second peripheral zone of the measuring hub and on which a wheel body can be mounted. The wheel body belongs to a test wheel and has an inner diameter which is greater than the outer diameter of the vehicle hub. The test wheel includes a rim which corresponds to the rim of a vehicle wheel normally mounted on the vehicle hub. The measuring hub is arranged essentially radially within the wheel body of the test wheel. The dimension in an axial direction of the connection between the vehicle hub and the test wheel, established through the measuring hub and the two adapters, is such that the center plane of the rim of the test wheel is in the same position with respect to the vehicle hub as the center plane of the rim of the vehicle wheel, replaced by the test wheel, when secured directly to the vehicle hub.

4 Claims, 2 Drawing Sheets

500

ARRANGEMENT FOR TORQUE MEASUREMENTS IN MOTOR VEHICLES

TECHNICAL FIELD

The invention relates to an arrangement for measuring torque in motor vehicles, comprising a measuring hub which includes first and second peripheral zones, a first adapter fastened to the first peripheral zone and adapted to be mounted on a vehicle hub, and a second adapter which is fastened to the second peripheral zone of the measuring hub and on which a wheel body can be mounted.

BACKGROUND ART

Arrangements of this kind are used, above all, when testing wheel brakes so that their brake torque may be determined while the vehicle is travelling, rather than on the test stand only. An arrangement of the type in question, useful with motor vehicles of various makes and sizes, is known from the prospectus "Radnaben-Drehmoment-Aufnehmer" by Messrs. Soemer GmbH of D-5940 Lennestadt 11. The measuring hub of that arrangement is a ring which comprises a plurality of chambers located between a flange-like radially inner peripheral area and an outer peripheral area and containing strain gauges. The strain gauges are connected by a slip ring arrangement to a measuring line which can be attached to the body of a test vehicle. The flange-like, radially inner peripheral area of the measuring hub is clamped by a first set of screws between a flange of a vehicle hub and a disc-shaped, first adapter which is centered at its inner periphery on a centering extension formed at the wheel hub and which, in turn, centers the measuring hub by its outer periphery. A second adapter is secured to the face end remote from the vehicle hub of the measuring hub; it includes a centering extension which is aligned with the centering extension of the vehicle hub and has the same diameter as that centering extension. The centering extension of the second adapter centers the wheel body of a vehicle wheel which, instead of being fixed to the flange of the vehicle hub by the tightening of screw bolts, is fastened to the second adapter by a set of wheel bolts.

With this known arrangement, the vehicle wheel is offset axially outwardly, as compared to its normal direct fixing on the wheel hub, by a distance which corresponds to the sum of the thicknesses of the measuring hub and the second adapter and measures 38 mm, in spite of the slender design of these two components. This means that the track of a motor vehicle which has each of its wheels mounted on the vehicle hub through intermission of such a measuring hub, including the adapters is wider by 76 mm than the normal state. Such widening of the track may cause considerable changes in the driving behavior of a motor vehicle. Therefore, any experience gained in braking tests of such a vehicle cannot be readily transferred to identical motor vehicles the wheels of which, however, are fastened directly to the wheel hubs. That applies especially to the front wheels whose roll radius and other geometric data are varied considerably by measuring hubs disposed in the known manner.

DISCLOSURE OF THE INVENTION

It is, therefore, the object of the invention to improve an arrangement for torque measurements in motor vehicles such that test results obtained with the arrangement from vehicles may be transfered without any problem to similar vehicles whose wheels are fastened directly to the vehicle hubs.

Starting from an arrangement of the kind specified initially, the object is met, in accordance with the invention, in that the wheel body belongs to a test wheel and has an inner diameter which is greater than the outer diameter of the vehicle hub, the test wheel includes a rim which corresponds to the rim of a vehicle wheel normally to be mounted on the vehicle hub, the measuring hub is arranged essentially radially within the wheel body of the test wheel, and the dimension in axial direction of the connection between the vehicle hub and the test wheel, established through the measuring hub and the two adapters, is such that the center plane of the rim of the test wheel is in the same position with respect to the vehicle hub as the center plane of the rim of the vehicle wheel, replaced by the test wheel, when secured directly to the vehicle hub.

This arrangement makes it possible to equip a vehicle at all its wheels with a measuring hub each of the known type and yet cause no changes in track or steering geometry, especially not as regards the roll radius of the vehicle. For this reason it is likewise possible, for test purposes, to replace only one of the normal vehicle wheels of a vehicle by an arrangement according to the invention, without any changes occurring in the driving characteristics. In any case, continued use is possible of the approved, unaltered measuring hubs employed so far, including their slip ring arrangements. The measurements which the arrangement according to the invention permits to be made may relate to driving as well as braking torques.

BRIEF DESCRIPTION OF THE DRAWINGS

Two embodiments of the invention will be described further below, with reference to a diagrammatic drawing each, in wich.

BEST MODE FOR CARRYING OUT THE INVENTION

Figure 1:
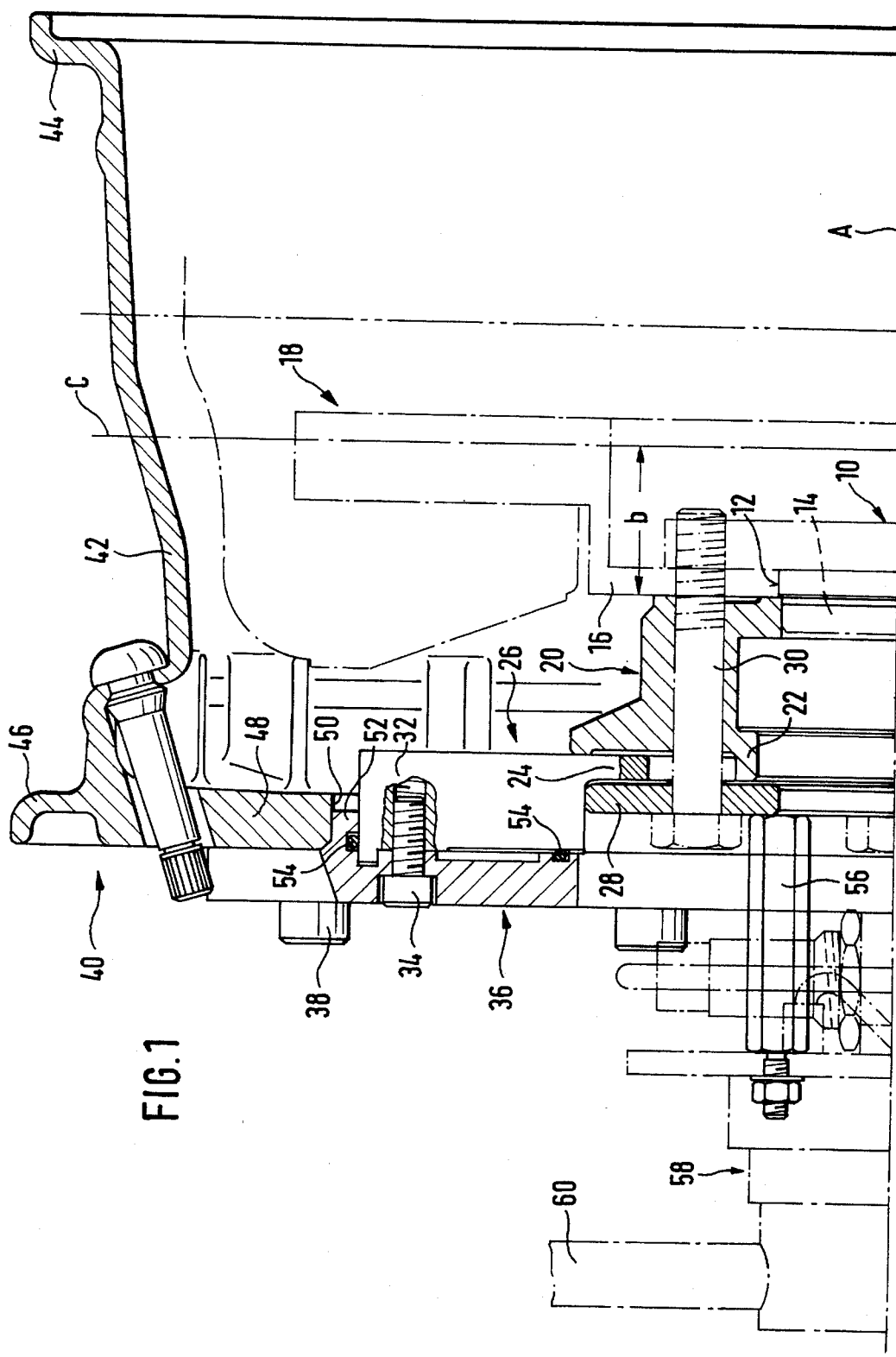
FIG. 1 is an axial semi-section of an arrangement for measuring torque in a passenger car and FIG. 2 shows a corresponding arrangement on a truck.

FIG. 1 illustrates a customary vehicle hub 10 comprising an axially inner centering extension 12 and an axially outer centering extension 14 on which are centered a radially inner flange 16 of a brake disc 18 and a first adapter 20, respectively. At its end remote from the vehicle hub 10, the first adapter 20 has a centering extension 22 which engages in a flange-like, radially inner peripheral zone 24 of a commercially available measuring hub 26, thus centering the same. In other words, it has a geometric axis A in common with the vehicle hub 10. The radially inner peripheral zone 24 of the measuring hub 26 is clamped by means of a first set of screw bolts 30 between a clamping ring 28 and the first adapter 20. The screw bolts 30, in their arrangement, correspond to the screw bolts normally used for fastening a wheel on the vehicle hub 10, yet they are commercially available machine screws of greater length. They each extend through a hole in the clamping ring 28, a radially inwardly open slot in the inner peripheral zone 24 of the measuring hub 26, and a hole in the first adapter 20, being threaded into one each of the conventional fixing holes in the vehicle hub 10. The first adapter 20 is formed with recesses in both face ends so that it will contact both the measuring hub 26 and the radially inner flange 16 of the brake disc 18 in narrow zones of annulus shape alone. Thereby, heat transfer from the brake disc to the measuring hub by way of heat conduction can take place to a minor degree only.

The measuring hub 26 includes an outer peripheral zone 32 provided in conventional manner with threaded bores. A second adapter 36 is secured to the same by a second set of screws 34. A test wheel 40 is fastened to the second adapter by means of a third set of screws 38. The screws 34 and 38 likewise are machine screws which are available on the market.

The test wheel 40 includes a rim 42 corresponding to that of a usual vehicle wheel and having an axially inner rim edge 44 as well as an axially outer rim edge 46. A substantially planar wheel body 48 of circular ring shape is disposed directly radially inside of the axially outer rim edge 46 and has an inner diameter which is much greater than that of a vehicle wheel which normally would be fastened on the vehicle hub 10. The test wheel 40 thus is designed in such a way that it cannot be secured directly to the vehicle hub 10, in contrast to the vehicle wheel instead of which it is provided. In this manner, free space is obtained radially inside of the inner edge of wheel body 48 to house the measuring hub 46.

The second adapter 36 has a centering extension 52 by which it is centered on the cylindrical outer surface of the measuring hub 26 while it, in turn, centers the wheel body 48 at the inner edge 50 thereof. The second adapter 36 is sealed, by an O-ring seal 54 each, with respect to the outer surface of the measuring hub 26 as well as the end surface thereof which is remote from the vehicle hub 10.

With respect to their axial dimensions, the two adapters 20 and 36 are matched to those of the measuring hub 26 and of the test wheel 40 such that the test wheel rim 42 has the same center dimension as the corresponding rim of a vehicle wheel which normally would be fastened on the vehicle hub 10. As usual, the center dimension b is defined as being the distance of the center plane C of the rim from the axially outer face end of the flange 16 of the brake disc against which rests the first adapter 20.

A plurality of stay bolts 56 extending parallel to the axis A are secured to the first adapter 20 by a threaded portion each of which passes through a respective radially inwardly open slot in the clamping ring 28. A member of a slip ring arrangement 58 rotating with the test wheel 40 is fixed to the stay bolts 56, while the non-rotating member of the slip ring arrangement is connected to a measuring cable 60.

In the sector of passenger cars, it is usually sufficient to keep in stock test wheels 40 of no more than three different rim sizes such as, for instance, 14"6J, 15"7J, and 16"7J for all the common types of vehicles to be subjected to measurements of driving or braking torques. The first figure refers to the rim diameter in inches, the second to the rim width in inches, and the letter J is a designation of the rim edge.

Figure 2:
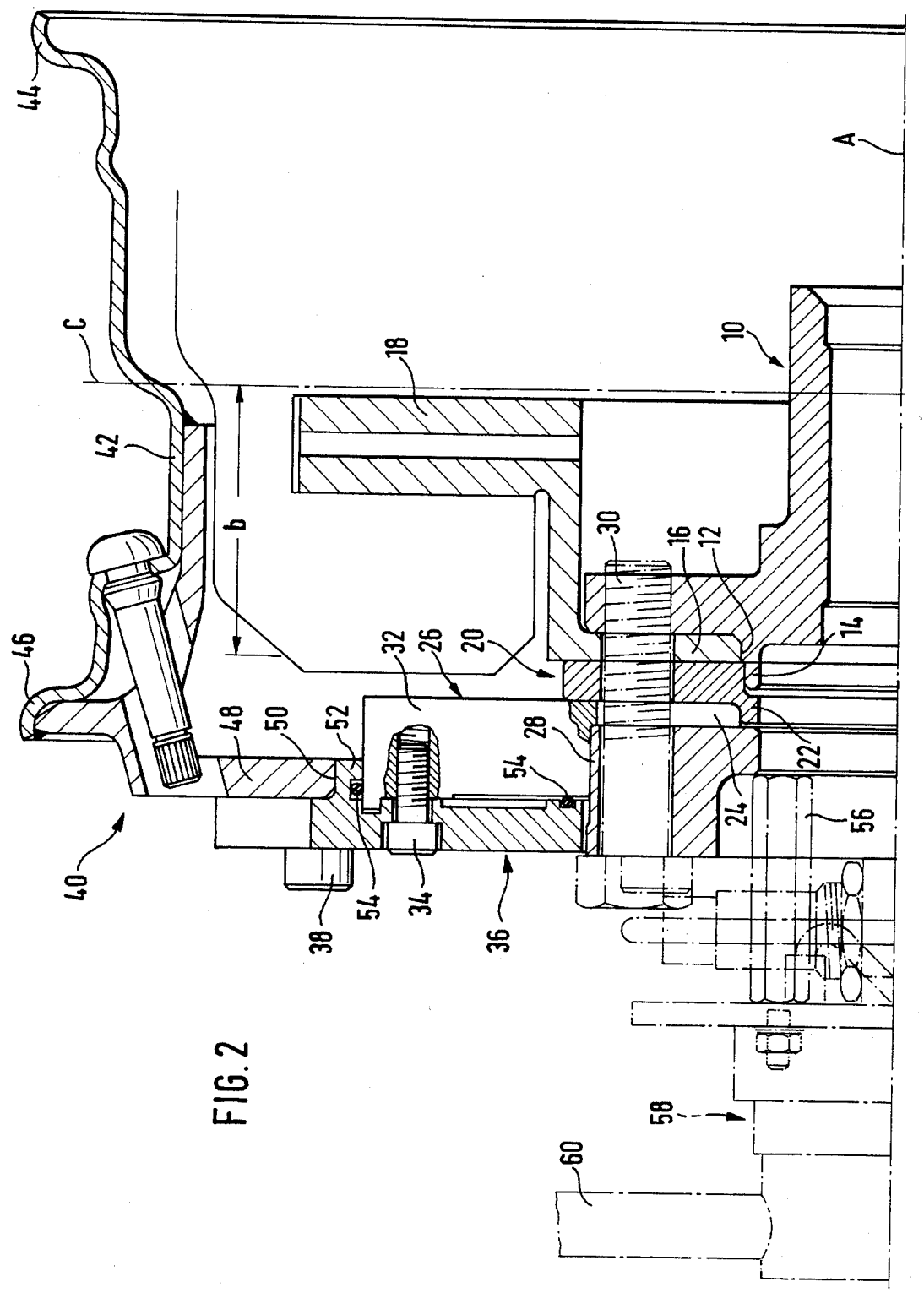

The above description of the arrangement shown in FIG. 1 and intended for a passenger car applies also to the arrangement illustrated in FIG. 2 which is destined for a truck. However, while the test wheel 40 according to FIG. 1 is an aluminum casting, the test wheel 40 according to FIG. 2 is made of a commercially available rim 42 and a wheel body 48 welded to the same and made of steel. The first adapter 20 according to FIG. 2 is a narrow annular disc having a diameter which is matched to the greater diameter, as compared to FIG. 1, of the vehicle hub 10 belonging to a truck. In correspondence with the conventional disposition of threaded bores in the vehicle hub 10 of a truck, the screw bolts 30 according to FIG. 2 are placed at a greater distance from the axis A than in FIG. 1. Consequently, there is no room for the screw bolts 30 radially inside the measuring hub 26, and for this reason FIG. 2 requires a clamping ring 28 of greater axial thickness to be used than is the case with FIG. 1. However, the measuring hub 26 as well as the second adapter 36 in FIG. 2 have the same dimensions as in FIG. 1. That remains so even if the first adapter 20 in one or the other arrangement is replaced by another first adapter of different axial dimensions to adapt it to different types of vehicles.

Obviously, numerous modifications and variations of the present invention are possible in light of the above teachings. It is therefore to be understood that within the scope of the appended claims, the invention may be practiced otherwise than as specifically described herein.

What is claimed is:

1. A torque measuring apparatus measuring torque in motor vehicles, comprising a measuring hub which includes first and second peripheral zones, a first adapter fastened to the first peripheral zone and mounted on a vehicle hub, and a second adapter fastened to the second peripheral zone of the measuring hub and on which a wheel body is mountable, wherein the wheel body comprises a portion of a test wheel and has an inner diameter which is greater than the outer diameter of the vehicle hub, the test wheel includes a rim which corresponds to a rim of a vehicle wheel normally mounted on the vehicle hub, the measuring hub is positioned radially within the wheel body of the test wheel, and a distance in an axial direction of the connection between the vehicle hub and the test wheel, established through the measuring hub and the first and second adapters, is such that a center plane of the rim of the test wheel is in the same position with respect to the vehicle hub as a center plane of the rim of the vehicle wheel, replaced by the test wheel, when secured directly to the vehicle hub.

2. The apparatus as claimed in claim 1, wherein the first adapter is disposed axially between the vehicle hub and the measuring hub and is replaceable by at least one other first adapter of a different axial length.

3. The apparatus as claimed in claim 1, wherein the second adapter has a centering extension which radially surrounds the measuring hub at an outside portion thereof and engages the wheel body of the test wheel.

4. The apparatus as claimed in claim 3, wherein the second adapter is sealed with respect to a front surface and an outer circumferential surface of the measuring hub.

* * * * *